(12) United States Patent
Martinsson et al.

(10) Patent No.: US 10,427,317 B2
(45) Date of Patent: Oct. 1, 2019

(54) BATTERY-POWERED PORTABLE CUTTING TOOLS

(75) Inventors: Pär Martinsson, Jönköping (SE); Johan Svennung, Jönköping (SE); Johan Björnlinger, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 295 days.

(21) Appl. No.: 13/263,403

(22) PCT Filed: Apr. 1, 2010

(86) PCT No.: PCT/EP2010/002127
§ 371 (c)(1),
(2), (4) Date: Oct. 7, 2011

(87) PCT Pub. No.: WO2010/115592
PCT Pub. Date: Oct. 14, 2010

(65) Prior Publication Data
US 2012/0023761 A1    Feb. 2, 2012

(30) Foreign Application Priority Data

Apr. 8, 2009    (WO) ................. PCT/EP2009/002587

(51) Int. Cl.
*A01G 3/053*    (2006.01)
*A01G 3/08*    (2006.01)
(Continued)

(52) U.S. Cl.
CPC .......... *B27B 17/0008* (2013.01); *A01G 3/053* (2013.01); *A01G 3/085* (2013.01);
(Continued)

(58) Field of Classification Search
CPC ........ A01G 3/053; A01G 3/085; A01G 3/086; A01G 3/088; B27B 17/0008;
(Continued)

(56) References Cited

U.S. PATENT DOCUMENTS 4,152,833 A * 5/1979 Phillips ..................... 30/382
4,370,810 A   2/1983 Schurr et al.
(Continued)

FOREIGN PATENT DOCUMENTS

EP    0743147 A1    11/1996
EP    1946899       7/2008
(Continued)

OTHER PUBLICATIONS

International Search Report and Written Opinion of PCT/EP2009/002587 dated Jan. 25, 2010.
(Continued)

*Primary Examiner* — Clark F Dexter
(74) *Attorney, Agent, or Firm* — Burr & Forman LLP (57) ABSTRACT

A battery-powered portable cutting tool includes a housing, a cutting element, an electric motor to drive the cutting element to cut, a battery to supply electric current to the motor and a control circuit to control the supply of electric current to the motor from the battery. The control circuit may include a main switch and an auxiliary switch. The control circuit may have an active state in which the main switch allows electric current to flow to the motor and an inactive state in which the main switch does not allow electric current to flow to the motor. The operation of the auxiliary switch causes the control circuit to change between the active and inactive states. The auxiliary switch is arranged to determine whether the tool is in an inappropriate state to be used and, if so, cause the control circuit to change to the inactive state.

15 Claims, 4 Drawing Sheets

(51) Int. Cl.
  *B23Q 11/00* (2006.01)
  *B27B 17/00* (2006.01)
  *B27B 17/08* (2006.01)
  *F16P 3/00* (2006.01)

(52) U.S. Cl.
  CPC .......... *A01G 3/086* (2013.01); *B23Q 11/0089* (2013.01); *B27B 17/083* (2013.01); *F16P 3/00* (2013.01)

(58) Field of Classification Search
  CPC . B27B 17/083; B23Q 11/078; B23Q 11/0089; B23Q 11/0092; F16P 3/00; F16P 3/008; F16P 3/20; H01H 9/06; H01H 2009/065
  USPC ................ 30/381–383, 216, 228; 200/42.01
  See application file for complete search history.

(56) References Cited

U.S. PATENT DOCUMENTS

| | | | | |
|---|---|---|---|---|
| 4,432,139 | A | * | 2/1984 | Kohler et al. ................ 30/381 |
| 4,543,723 | A | * | 10/1985 | Bortfeld et al. ............. 30/381 |
| 4,656,985 | A | * | 4/1987 | Andreasson et al. ........ 123/335 |
| 5,150,523 | A | | 9/1992 | McCurry |
| 5,510,589 | A | * | 4/1996 | Arnal ................... H01H 13/50 200/302.2 |
| 5,685,080 | A | | 11/1997 | Amano et al. |
| 5,709,032 | A | * | 1/1998 | Mizutani et al. .............. 30/382 |
| 5,724,737 | A | | 3/1998 | Stones |
| 6,144,307 | A | * | 11/2000 | Elliot ...................... B66D 1/58 340/665 |
| RE37,832 | E | | 9/2002 | Nakamura et al. |
| 6,878,888 | B1 | | 4/2005 | Jong |
| 2004/0098869 | A1 | | 5/2004 | Ashfield |
| 2004/0181951 | A1 | * | 9/2004 | Wittke ................. B23D 59/001 30/382 |
| 2005/0028375 | A1 | | 2/2005 | Stones et al. |
| 2006/0230870 | A1 | * | 10/2006 | Fukase ..................... B60T 7/06 74/512 |
| 2007/0120696 | A1 | * | 5/2007 | McRae .................. G08B 13/10 340/686.1 |
| 2009/0193669 | A1 | * | 8/2009 | Gorenflo ............... B27B 17/083 30/382 |

FOREIGN PATENT DOCUMENTS

| | | |
|---|---|---|
| WO | 2007147157 | 12/2007 |
| WO | 2009142334 | 11/2009 |

OTHER PUBLICATIONS

Chapter I International Preliminary Report on Patentability of PCT/EP2009/002587 dated Oct. 11, 2011.
International Search Report and Written Opinion of PCT/EP2010/002127 dated Aug. 24, 2010.
Chapter II International Preliminary Report on Patentability of PCT/EP2010/002127 dated Jul. 18, 2011.

* cited by examiner

BATTERY-POWERED PORTABLE CUTTING TOOLS

This invention relates to battery-powered portable cutting tools, such as chainsaws.

Chainsaws and other battery-powered portable cutting tools, such as hedge trimmers, generally comprise a housing supporting a battery, a motor and a cutting element. The battery powers the motor, which in turns drives the cutting element to cut. In a chainsaw, the blade is an endless chain loop carrying cutting elements, and the motor drives the chain along its length, such that the cutting elements will be driven through whatever is to be cut.

It is desirable to attempt to ensure that the tool activates only when desired; otherwise, a user could be surprised by an inadvertent activation of the chainsaw, particularly if that user is inexperienced in the use of such tools. With petrol- or gasoline-powered portable cutting tools, it is obvious when such tools are potentially active, as the engine that powers those tools makes noise when idle. A battery-powered cutting tool, on the other hand, makes no noise when idle.

According to a first aspect of the invention, there is provided a battery-powered portable cutting tool, comprising: a housing, a cutting element supported by the housing, an electric motor coupled to the cutting element so as to drive the cutting element to cut, a battery electrically coupled to the motor so as to supply electric current to the motor and a control circuit arranged to control the supply of electric current to the motor from the battery, in which the control circuit comprises a main switch operable by a user and an auxiliary switch also operable by a user;
in which the control circuit has:
an active state in which operation of the main switch by the user allows electric current to flow to the motor so as to cause the cutting element to be driven; and
an inactive state in which operation of the main switch does not allow electric current to flow to the motor and so the motor does not drive the cutting element;
in which operation of the auxiliary switch causes the control circuit to change between the active and inactive states;
and in which the auxiliary switch comprises a hook from which the tool can be suspended, the auxiliary switch being arranged such that suspension of the tool from the hook causes the control circuit to change to the inactive state.

Thus, the act of suspending the tool will cause it to become inactive; a user cannot be surprised by cutting element being driven should the main switch be inadvertently activated.

The hook may be pivotally mounted on the housing and may have a protruding position, in which the tool can be suspended from the hook, and a folded-in position, where the hook is folded further in towards the housing relative to the protruding position; for example, in the folded-in position, the hook may be flat against the housing. The action of folding the hook into the folded-in position may cause the control circuit to move into the active state.

Alternatively, the hook may be mounted on the housing by means of a load sensor, the auxiliary switch causing the control circuit to change to the inactive state should the load on the hook through the load sensor exceed a predetermined limit, which may be the weight, or at least 50%, 75% or 90% of the weight, of the tool. As such, this can sense whether the tool is being suspended through the hook, and deactivate the tool if so.

The tool may be a chainsaw or a hedge trimmer.

According to a second aspect of the invention, there is provided a battery-powered chainsaw, comprising: a housing, a cutting chain supported by the housing, an electric motor coupled to the cutting chain so as to drive the cutting chain to cut, a battery electrically coupled to the motor so as to supply electric current to the motor, a chain brake operable by a user to brake movement of the chain, and a control circuit arranged to control the supply of electric current to the motor from the battery, in which the chain brake comprises a chain brake handle by means of which a user can operate the chain brake;
in which the control circuit comprises a main switch operable by a user and an auxiliary switch also operable by a user;
in which the control circuit has:
an active state in which operation of the main switch by the user allows electric current to flow to the motor so as to cause the cutting element to be driven; and
an inactive state in which operation of the main switch does not allow electric current to flow to the motor and so the motor does not drive the cutting chain;
in which operation of the auxiliary switch causes the control circuit to change between the active and inactive states;
and in which the auxiliary switch is operated by operating the chain brake handle.

Thus, if the chain brake is applied, the chainsaw may, typically immediately, be placed into the inactive state, reducing the potential for further movement of the blade.

The auxiliary switch may be coupled to the chain brake handle such that application of the chain brake places the control circuit in the inactive state; releasing the chain brake may place the control circuit in the active state, either directly after releasing the brake or by pulling the brake handle towards a switching position which is preferably located towards the housing.

According to a third aspect of the invention, there is provided a battery-powered portable cutting tool, comprising: a housing, a cutting element supported by the housing, an electric motor coupled to the cutting element so as to drive the cutting element to cut, a battery electrically coupled to the motor so as to supply electric current to the motor and a control circuit arranged to control the supply of electric current to the motor from the battery, in which the control circuit comprises a main switch operable by a user and an auxiliary switch also operable by a user;
in which the control circuit has:
an active state in which operation of the main switch by the user allows electric current to flow to the motor so as to cause the cutting element to be driven; and
an inactive state in which operation of the main switch does not allow electric current to flow to the motor and so the motor does not drive the cutting element;
in which operation of the auxiliary switch causes the control circuit to change between the active and inactive states;
and in which the auxiliary switch is connected to a switch that has at least 3 switching positions, the first of these switching positions is an activation position, the second position is a neutral position and the third position is a deactivation position.

With using this type of switch connected to the auxiliary switch does allow for a very intuitive handling of the activation and deactivation of the battery powered cordless tool. As with this configuration the user has always to move the switch into the same direction for activation and into the other direction for deactivation of the tool.

According to a forth aspect of the invention, there is provided a battery-powered portable cutting tool, comprising: a housing, a cutting element supported by the housing, an electric motor coupled to the cutting element so as to drive the cutting element to cut, a battery electrically coupled to the motor so as to supply electric current to the motor and a control circuit arranged to control the supply of electric current to the motor from the battery, in which the control circuit comprises a main switch operable by a user and an auxiliary switch also operable by a user;
in which the control circuit has:
an active state in which operation of the main switch by the user allows electric current to flow to the motor so as to cause the cutting element to be driven; and
an inactive state in which operation of the main switch does not allow electric current to flow to the motor and so the motor does not drive the cutting element;
in which operation of the auxiliary switch causes the control circuit to change between the active and inactive states;
the auxiliary switch being arranged so as to determine whether the tool is in an inappropriate state to be used and, if so, cause the control circuit to change to the inactive state.

The tool may be a chainsaw or hedge trimmer.

Thus, the auxiliary switch can be used to deactivate the tool should it not be in an appropriate position for use. As such, this can prevent inadvertent activation of such a tool. One of various different inappropriate states for a cutting tool is the situation in which this cutting tool is in suspended position.

In one example, the auxiliary switch may be arranged to determine whether the tool is being suspended; as such, the tool may be one according to the first aspect of the invention. Alternatively, where the tool is a chainsaw having a chain brake operable by a user to brake movement of the chain, the auxiliary switch may be arranged to determine whether the chain brake has been applied and, if so, place the control circuit in the inactive position; as such, the tool may be one according to the second aspect of the invention.

For any of the preceding aspects of the invention, the control circuit may be arranged with the main switch and the auxiliary switch in series; thus, in order for current to flow through the control circuit, both switches must be opened.

The control circuit may be arranged to enter the inactive state if the main switch is not activated for a pre-determined period of time. This means that if the tool is not used for the period, action will need to be taken by the user in order to reactivate it, thus reducing the chance of the user being surprised by an inadvertent operation.

In such a case, the control circuit may be arranged such that manipulation of the auxiliary switch after the control circuit has deactivated after the passage of the period of time causes the control circuit to enter the active state. This is a convenient way of waking a dormant tool.

There now follows, by way of example only, embodiments of the invention, described with reference to the accompanying drawings, in which.

Figure 1:
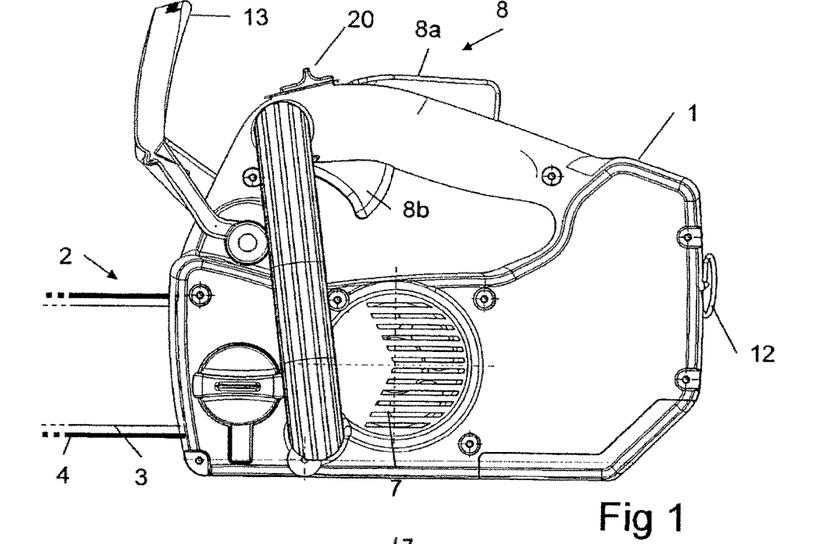
FIG. 1 shows a side elevation of a chainsaw according to an embodiment of the invention, in the active state.

A chainsaw according to an embodiment of the invention is shown in the accompanying drawings. It comprises a housing 1 supporting a cutting element 2 (shown only in FIG. 1). The cutting element comprises an elongate support 3 over which an endless loop of cutting chain 4 runs. The cutting chain has cutting elements on each link.

In order to drive the cutting chain 4, a battery 5 and a motor 6 (both shown in FIG. 5) are provided in the housing. The motor 6 acts to rotate a drive wheel 7 and so drive the chain 4 around the support 3 when current is supplied to it by the battery 5.

The main control a user has over the operation of the chainsaw is by the use of the main switch 8. The user must squeeze both parts 8a, 8b of the main switch in order to allow current to flow from the battery 5 to the motor 6 and so drive the cutting chain 3 to cut.

The chainsaw is also provided with a chain brake 17, which acts to physically brake the rotation of the drive wheel 7. This is activated by the user pushing forwards (that is, towards the blade, and to the left in the Figures) a chain brake handle 13. This is useful if the user wishes to stop the chainsaw quickly. The chain brake 17 may also active through the action of inertia should a kickback event occur.

However, in order to prevent inadvertent activation of the chainsaw, the chainsaw is provided with a control circuit 9, which controls the passage of current from the battery 5 to the motor 6. This is shown in more detail in FIG. 5 of the accompanying drawings. The control circuit 9 comprises three switches in series; accordingly, in order for current to flow from the battery 5 to the motor 6 all three switches must be closed.

Figure 5:
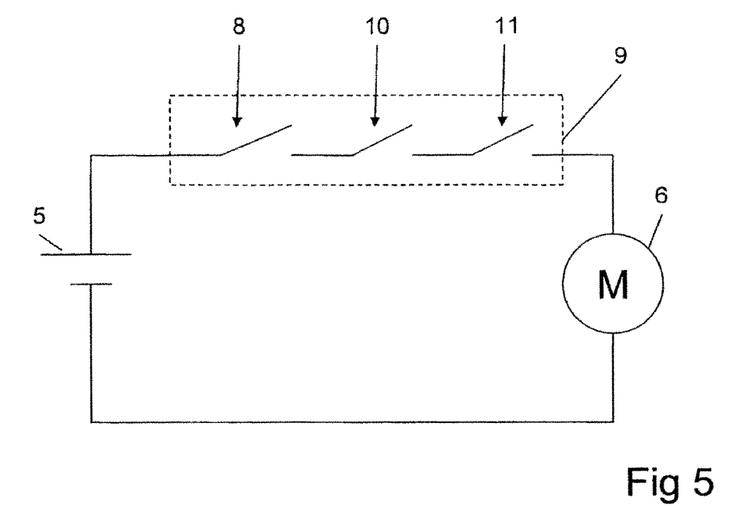
FIG. 5 shows a circuit diagram of the electric circuit controlling the chainsaw of FIG. 1.

The first switch in the series is the main switch 8; this functions as discussed above, with the user squeezing the two parts 8a, 8b in order to activate the chainsaw and so cause the chainsaw to cut.

The remaining two switches 10, 11 are first and second auxiliary switches respectively. If either of these two switches are open, then the control circuit 9 is in an inactive state; activation of the main switch 8 will not cause the chainsaw to cut. However, if both of the auxiliary switches 10, 11 are closed, then the control circuit 9 is in an active state, and the main switch will function to operate the chainsaw.

Figure 2:
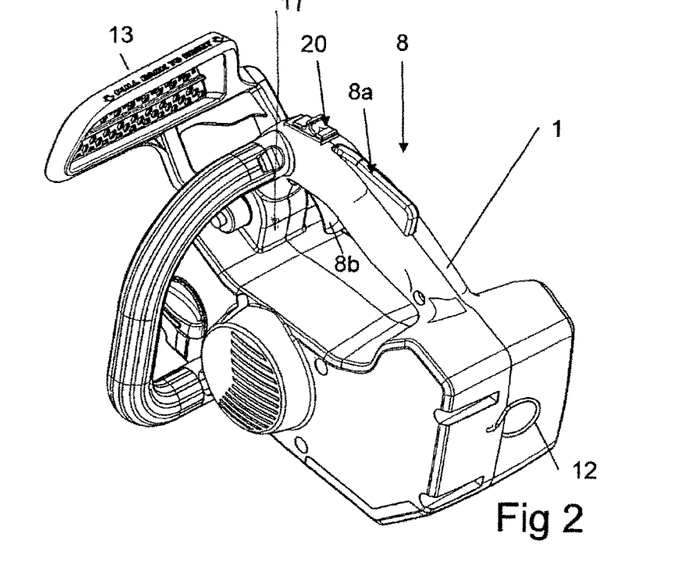
FIG. 2 shows a perspective view of the chainsaw of FIG. 1.

The first auxiliary switch 10 comprises a hook 12 pivotally mounted on the rear (that is, the end opposite the cutting element 2) of the housing 1. The hook 12 therefore has two positions: a folded-in position, shown in FIGS. 1 and 2 of the accompanying drawings, in which the hook 12 lies against the housing, and a protruding position, shown in FIGS. 3 and 4 of the accompanying drawings, in which the hook 12 protrudes normal to the housing. In the protruding position, the hook 12 can be used to suspend the chainsaw, typically so it can be hoisted up a tree that is being sawn.

Figure 3:
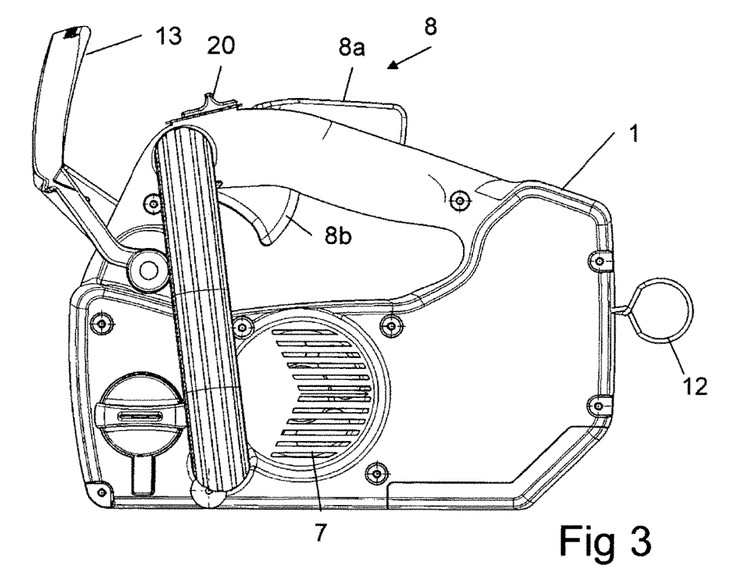
FIG. 3 shows a side elevation of the chainsaw of FIG. 1, in an inactive state.
Figure 4:
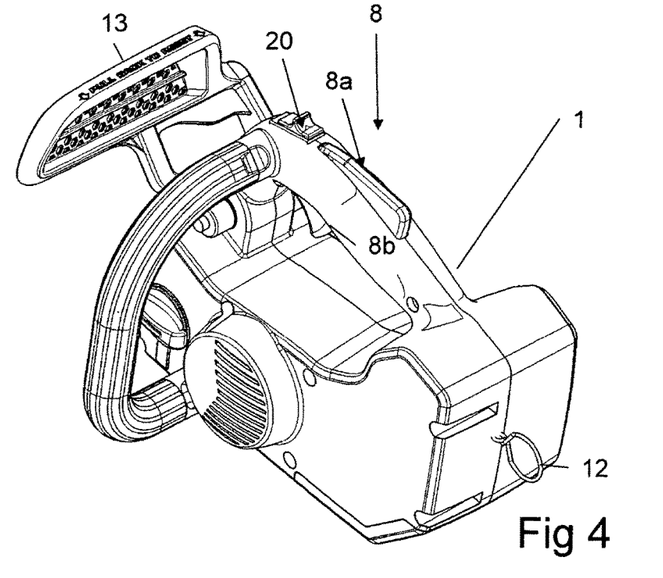
FIG. 4 shows a perspective view of the chainsaw of FIG. 1, in the inactive state.

As it is undesirable that the chainsaw operates whilst being suspended from the hook 12, the first auxiliary switch 10 is electrically open when the hook 12 is in the protruding position of FIGS. 3 and 4 of the accompanying drawings. The first auxiliary switch 10 is electrically closed by moving the hook 12 into the folded-in position of FIGS. 1 and 2 of the accompanying drawings. Thus, the control circuit 9 will be in the inactive state if the hook 12 is in the protruding position and so could be used to suspend the chainsaw, whereas the control circuit 9 could be in the active state with the hook 12 in the folded-in position. Thus, it is difficult if not impossible for the chainsaw to be activated with the chainsaw suspended from the hook 12.

Figure 7:
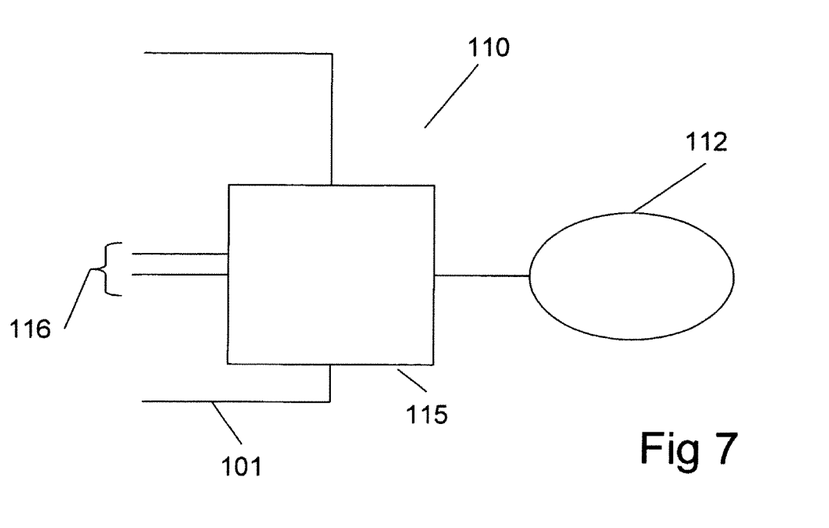
FIG. 7 shows a first auxiliary switch according to a further embodiment of the invention.

In alternative embodiment, the first auxiliary switch 110 is as shown in FIG. 7 of the accompanying drawings. In this embodiment, rather than being pivotally mounted on the housing 101, the hook 112 is provided as protruding directly outwards from the housing 101. The hook 112 is mounted on the housing 101 through a load sensor 115, such as a strain gauge. The load sensor determines the force applied by the hook 112 on the housing 101. If the force on the load sensor due to the hook is greater than a predetermined limit—say 50% of the weight of the chainsaw—then the first auxiliary switch will open, and no current can pass between the terminals 116. If the force on the load sensor due to the hook is less than this limit, the first auxiliary switch will close, allowing current to flow between the terminals 116. Thus, suspending the chainsaw from the hook 112 will mean that the weight of the chainsaw will act through the hook, causing the first auxiliary switch 110 to open.

Returning now to the embodiment of FIGS. 1 to 6, the second auxiliary switch 11 is coupled to the chain brake handle 13. On activation of the chain brake by the chain brake handle, the second auxiliary switch 11 will open, putting the control circuit 9 into the inactive state. This is useful, as if the chain brake handle 13 has been activated (pushed away from the user, towards the cutting element 2), then it must be desired to stop the cutting element 2. Similarly, the second auxiliary switch 11 will close if the chain brake handle is reset, allowing the control circuit 9 to return to the active state (dependent upon the state of the first auxiliary switch).

Thus, by providing the second auxiliary switch 11 coupled to the chain brake handle 13, the motor can be stopped at the same time that the chain brake is being used to stop the chain, which may lead to quicker stopping of the chain. Furthermore, if the chain brake is applied a user is unlikely to desire to activate the motor against the brake, and so the inactive state is appropriate, as it will prevent any inadvertent activation of the motor against the brake, which could lead to overheating of the motor.

Additionally or alternatively, the second auxiliary switch can be coupled to the chain brake handle, but be activatable not only when the chain brake is activated. Thus, the chain brake handle may have three positions: a first position pushed fully away from the user towards the chain, where the chain brake is activated and at the same time the control circuit of the chainsaw is put into the inactive state; a second, neutral and intermediate, position in which the chain saw can be used, and a third, switching position pulled closest to the user and the housing 1. Movement of the chain brake handle into this third switching position can act to either switch the control circuit of the chainsaw into the active state, or can act to toggle the chainsaw between the inactive and active states. Preferably the chain brake handle will not be stable in this third switching position and will tend to return to the second position.

Thus this aspect of the invention allows for different alternatives how the chainsaw can be activated or deactivated using the chain brake handle.

In the preferred embodiment the chainsaw will always be put into the inactive state when the user is pushing the chain brake handle into the first position towards the chain. Pulling the chain brake handle back into the intermediate (working) second position will keep the chainsaw inactive. By further pulling the chain brake handle into the third position closest to the user the chain saw will be put into its active state again. Preferably the chain brake handle will be spring biased in a way that this third position is not a stable position, thus the chain brake handle will automatically move back from the third position into the second position when the user releases it. With this very intuitive configuration a pushing of the chain brake handle will result in putting the chainsaw into an inactive mode whilst a pulling action will place the chainsaw into the active state to an activation of the chainsaw.

In an alternative embodiment the movement of the chain brake handle between the second and third position could toggle the chainsaw between the active and the inactive state. Thus if the chain brake handle is in the second position and the chainsaw is in the inactive state the pulling of the chain brake handle towards the third position will put the chainsaw into active state. In case that the chain brake handle is in the second position and the chainsaw is in active state the pulling of the chain brake handle into the third position would put the chainsaw into an inactive state. With this embodiment or in a further alternative embodiment the movement of the chain brake handle from the first position towards the second position could already put the chainsaw into an active state.

In addition, a power switch 20 can be provided, which can cut all power from the chainsaw; alternatively, this switch 20 can act as a further auxiliary switch, arranged to toggle the chainsaw between the active and inactive states, as described with the third embodiment of the invention. In this case switch 20 incorporates at least 3 different switching positions. Preferably this kind of switch is combined with the activation and deactivation procedure as described above connected to the chain brake handle 13. Specially then it is of advantage if the switch 20 is oriented on the chainsaw as shown with FIGS. 1 to 4. Thus, preferably the first position to activate the chain saw is located away from the chain saw towards the user and the third switching position to deactivate the chain is located toward the chain or chain brake handle. With an arrangement like this, the directions of movement to activate or to deactivate the chainsaw are the same for the switch 20 as for the chain brake handle 13 which results in a intuitive handling for the user.

Figure 6:
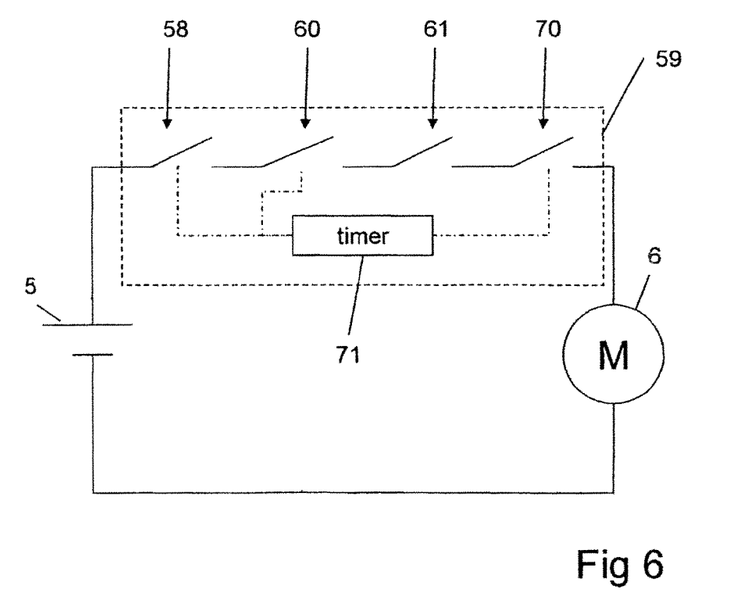
FIG. 6 shows an alternative embodiment of the circuit of FIG. 5.

In a further embodiment extending the present embodiment, the control circuit has been extended as shown in FIG. 6 of the accompanying drawings. Equivalent reference numerals to the first embodiment are used, raised by 50.

In this embodiment, the functioning of the chainsaw is largely as described above. A control circuit 59 comprises a main switch 58 and first and second auxiliary switches 60 and 61. However, a third auxiliary switch 70 is provided, together with a timing circuit 71. The timing circuit is coupled to the main switch 58; if the main switch is not activated within a predetermined period (say anything from 30 seconds to 5 minutes), then the timing circuit will open the third auxiliary switch 70, thus placing the control circuit 59 in the inactive state.

This is useful in making a chainsaw that has not been used for a period of dormant time. A user is therefore less likely to be surprised should they inadvertently operate the main switch 58.

In order to provide for reactivating the chainsaw, the timing circuit 71 is also coupled to the first auxiliary switch 60, such that, should the user move the hook 12, the timing circuit will close the third auxiliary switch 70. Accordingly, in order to put the chainsaw back into the active state, all a user need to do is move the hook from the folded-in position to the protruding position and back again. Alternatively, the third auxiliary switch 70 may be directly engagable by a user; for example, if the device is dormant, then by manipulating the power switch 20 of FIG. 1 off and on again, a user can reactivate the device.

The invention claimed is:

1. A battery-powered chainsaw, comprising:
   a housing,
   a cutting chain supported by the housing,
   an electric motor coupled to the cutting chain so as to drive the cutting chain to cut,
   a battery electrically coupled to the motor so as to supply electric current to the motor,
   a chain brake operable by a user to brake movement of the cutting chain, and
   a control circuit coupled to the motor and the battery to control the supply of electric current to the motor from the battery,
   in which the chain brake comprises a chain brake handle via which the chain brake is operable by the user;
   in which the control circuit comprises a main switch operable by the user and first and second auxiliary switches also operable by the user;
   in which the control circuit has:
   an active state in which the first auxiliary switch and the second auxiliary switch are in a first state, in which operation of the main switch to an actuated state by the user allows electric current to flow from the battery to the motor so as to cause the cutting chain to be driven; and
   an inactive state in which at least one of the first auxiliary switch and the second auxiliary switch is in a second state, in which operation of the main switch to the actuated state does not allow electric current to flow from the battery to the motor and so the motor does not drive the cutting chain;
   in which, while the main switch is in the actuated state and the first auxiliary switch and the second auxiliary switch are in the first state, subsequent operation of the first auxiliary switch or second auxiliary switch to the second state causes the control circuit to change from the active state to the inactive state;
   in which the first auxiliary switch is operated by operating the chain brake handle; and
   in which the second auxiliary switch includes a suspension element extending outward and away from the housing of the chainsaw and a load sensor configured to determine whether a force applied to the load sensor, by the suspension element, in a direction away from the housing satisfies a predetermined load limit and, if so, the second auxiliary switch changes to the second state causing the control circuit to change to the inactive state.

2. The chainsaw of claim 1, in which the first auxiliary switch is coupled to the chain brake handle such that application of the chain brake handle places the control circuit in the inactive state.

3. The chainsaw of claim 1, in which the chain brake handle is biased such that releasing the chain brake handle places the first auxiliary switch in the first state.

4. The chainsaw of claim 1, in which the chain brake handle has three positions: a first position, where the chain brake is activated and the first auxiliary switch is switched into the second state; a second position in which the chain brake is not activated and the first auxiliary switch is in the first state, and a third, switching position, in which movement of the chain brake handle into the switching position acts to switch the first auxiliary switch into the first state.

5. The chainsaw of claim 1, in which the control circuit is arranged with the main switch and the first and second auxiliary switches in series.

6. The chainsaw of claim 1, wherein the load sensor comprises a strain gauge.

7. A battery-powered portable cutting tool, comprising:
   a housing,
   a cutting element supported by the housing and extending from a cutting end of the housing,
   an electric motor coupled to the cutting element so as to drive the cutting element to cut,
   a battery electrically coupled to the motor so as to supply electric current to the motor,
   a chain brake operable by a user to brake movement of the cutting element, and
   a control circuit coupled to the battery and the motor to control the supply of electric current to the motor from the battery,
   in which the control circuit comprises a main switch operable by the user and an auxiliary switch also operable by the user;
   in which the control circuit has:
   an active state in which the auxiliary switch is in a first state, in which operation of the main switch to an actuated state by the user allows electric current to flow from the battery to the motor so as to cause the cutting element to be driven; and
   an inactive state in which the auxiliary switch is in a second state, in which operation of the main switch to the actuated state does not allow electric current to flow from the battery to the motor and so the motor does not drive the cutting element;
   in which, while the main switch is in the actuated state, operation of the auxiliary switch from the first state to the second state causes the control circuit to change from the active state to the inactive state;
   wherein the auxiliary switch includes a suspension element extending outward and away from the housing of the tool at a rear end of the housing of the tool that is opposite the cutting end of the housing where the cutting element is supported and a load sensor configured to determine whether a force applied to the load sensor, by linear motion of the suspension element, in a direction away from the housing satisfies a predetermined load limit and, if so, the auxiliary switch causes the control circuit to change to the inactive state.

8. The tool of claim 7, wherein the tool comprises a chainsaw.

9. The tool of claim 7, in which the control circuit is arranged with the main switch and the auxiliary switch in series.

10. The tool of claim 7, in which a timing circuit is coupled to the auxiliary switch and the main switch, and the control circuit is arranged to enter the inactive state if the main switch is not activated for a predetermined period of time as determined by the timing circuit.

11. The tool of claim 10, in which the control circuit is arranged such that manipulation of the auxiliary switch after the control circuit has deactivated after the passage of the period of time causes the control circuit to enter the active state.

12. The tool of claim 7, wherein the load sensor comprises a strain gauge.

13. A battery-powered portable cutting tool, comprising:
a housing,
a cutting element supported by the housing, an electric motor coupled to the cutting element so as to drive the cutting element to cut,
a battery electrically coupled to the motor so as to supply electric current to the motor,
a chain brake comprising a brake handle operable by a user to brake movement of the cutting element, and
a control circuit coupled to the battery and the motor to control the supply of electric current to the motor from the battery,
in which the control circuit comprises a main switch operable by the user and an auxiliary switch also operable by the user;
in which the control circuit has:
an active state in which the auxiliary switch is in a first state, in which operation of the main switch to an actuated state by the user allows electric current to flow from the battery to the motor so as to cause the cutting element to be driven; and
an inactive state in which the auxiliary switch is in a second state, in which operation of the main switch to the actuated state does not allow electric current to flow from the battery to the motor and so the motor does not drive the cutting element;
in which, while the main switch is in the actuated state, operation of the auxiliary switch from the first state to the second state causes the control circuit to change from the active state to the inactive state;
wherein the auxiliary switch includes a suspension element extending outward and away from the housing of the tool and a load sensor configured to determine whether a force applied to the load sensor, by linear motion of the suspension element, in a direction away from the housing satisfies a predetermined load limit and, if so, the auxiliary switch causes the control circuit to change to the inactive state.

14. A battery-powered portable cutting tool, comprising:
a housing,
a cutting element supported by the housing,
an electric motor coupled to the cutting element so as to drive the cutting element to cut,
a battery electrically coupled to the motor so as to supply electric current to the motor,
a chain brake comprising a brake handle operable by a user to brake movement of the cutting element, and
a control circuit coupled to the battery and the motor to control the supply of electric current to the motor from the battery, the control circuit comprising a main switch and an auxiliary switch;
wherein the control circuit is configured to be in an active state in response to the auxiliary switch being in a first state;
wherein, in the active state, the control circuit is configured to pass electric current from the battery to the motor to cause the cutting element to be driven in response to the main switch being in an actuated state;
wherein the control circuit is configured to be in an inactive state in response to the auxiliary switch being in a second state;
wherein, in the inactive state, the control circuit is configured to prevent electric current from passing from the battery to the motor to prevent the motor from driving the cutting element whether the main switch is in the actuated state or an unactuated state;
wherein the auxiliary switch includes a suspension element connected to a load sensor, and wherein the auxiliary switch is configured to be in the second state in response to a weight of the tool being applied to the load sensor through the suspension element.

15. A battery-powered portable cutting tool, comprising:
a housing,
a cutting element supported by the housing and extending from a cutting end of the housing,
an electric motor coupled to the cutting element so as to drive the cutting element to cut,
a battery electrically coupled to the motor so as to supply electric current to the motor, and
a control circuit coupled to the battery and the motor to control the supply of electric current to the motor from the battery, the control circuit comprising a main switch and an auxiliary switch;
wherein the control circuit is configured to be in an active state in response to the auxiliary switch being in a closed state; wherein, in the active state, the control circuit is configured to pass electric current from the battery to the motor to cause the cutting element to be driven in response to the main switch being in an actuated state;
wherein the control circuit is configured to be in an inactive state in response to the auxiliary switch being in an open state; wherein, in the inactive state, the control circuit is configured to prevent electric current from passing from the battery to the motor to prevent the motor from driving the cutting element whether the main switch is in the actuated state or an unactuated state;
wherein the auxiliary switch includes a suspension element mounted on the housing through a load sensor, the suspension element disposed at a rear end of the housing of the tool that is opposite the cutting end of the housing where the cutting element is supported, the load sensor configured to cause, based on a force applied to the load sensor, the auxiliary switch to be in the open state to cause the control circuit to change to the inactive state.

* * * * *